(12) United States Patent
Kimura et al.

(10) Patent No.: US 6,288,469 B1
(45) Date of Patent: Sep. 11, 2001

(54) FIXING DEVICE AND METHOD FOR A BRUSH HOLDER

(75) Inventors: Masakatsu Kimura, Ohta; Yasuo Ohtani, Yamada, both of (JP)

(73) Assignee: Mitsuba Corporation, Gunma-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,564

(22) Filed: Jun. 24, 1998

(30) Foreign Application Priority Data

Jul. 2, 1997 (JP) .................................... 9-191979

(51) Int. Cl.⁷ ............................ H02K 5/14; H02K 13/00
(52) U.S. Cl. .............................. 310/239; 29/596; 29/513; 29/505; 310/42; 403/279
(58) Field of Search .................. 310/239, 42; 29/596, 29/597, 826, 513, 505, 521, 509; 403/282, 279, 281; 24/295; 292/253; 220/682

(56) References Cited

U.S. PATENT DOCUMENTS

| 2,561,638 | * | 7/1951 | Richardson | ............................. 85/32 |
| 3,091,838 | * | 6/1963 | Hild et al. | ............................. 29/509 |
| 4,691,765 | | 9/1987 | Wozniczka | .......................... 165/80.3 |
| 6,058,018 | * | 5/2000 | Gerrits | ................................. 361/737 |

* cited by examiner

*Primary Examiner*—Karl Tamai
(74) *Attorney, Agent, or Firm*—Oliff & Berridge, P.L.C (57) ABSTRACT

A fixing device for a brush holder having a pair of leg pieces extending away from an upper surface of the brush holder. The leg pieces have fingers extending away from the free ends of the leg pieces and penetrating through holes in an attachment surface section of a holder stay. The fingers are bent onto a back face of the attachment surface section such that the bent fingers are oblique relative to a longitudinal axis of the brush holder, thereby preventing any backlash from occurring. The fixing device is formed by a two step bending process using first and second jigs.

2 Claims, 7 Drawing Sheets

FIXING DEVICE AND METHOD FOR A BRUSH HOLDER

BACKGROUND OF THE INVENTION

1. Field of the Invention

The invention relates to the technical field of an electric motor provided in a member device such as electrical equipment. More particularly, the invention provides a method and apparatus for fixing a brush holder to a holder stay.

2. Description of the Related Art

Generally speaking, some electric motors have feed members, such as brushes, brush holders within which the brushes movably fit, and a holder stay to which the brush holders are attached and fixed.

Figure 1:
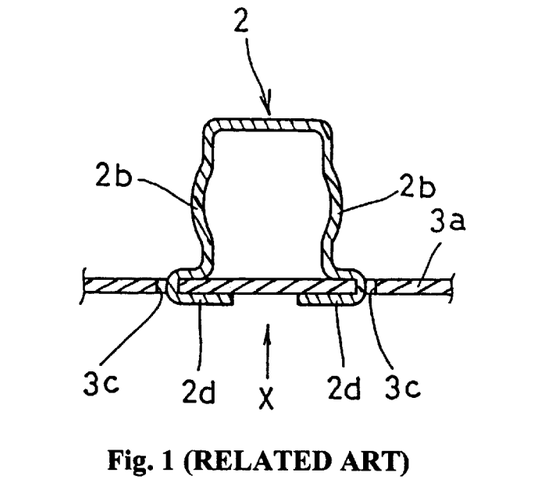
FIG. 1 is a cross-sectional view of a conventional brush holder.
Figure 2:
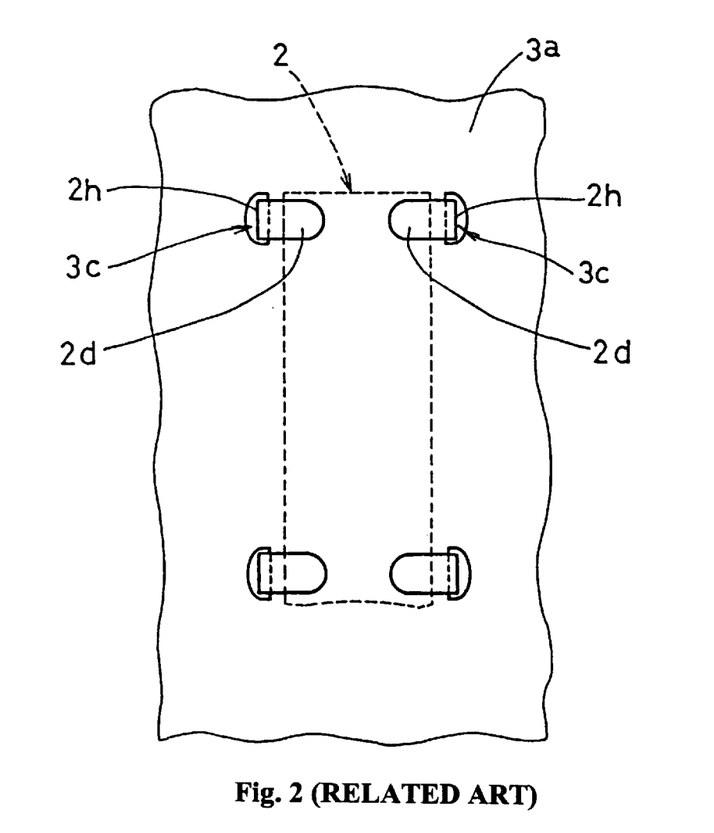
FIG. 2 is a front view of the conventional brush holder shown in FIG. 1 taken in the direction of X.

As shown in FIG. 1, some electric motors have a metal brush holder 2 with two pairs of fingers 2d formed to extend from both leg pieces 2b of the brush holder 2 so the fingers 2b face each other in parallel. The fingers 2d are then fixed to the holder stay 3 by first passing each finger 2d through a respective through hole 3c of the holder stay 3. The through holes 3c are slot-shaped and formed in an attachment surface section 3a of the holder stay 3. Each finger 2b is then bent along the back side of the attachment surface section 3a. As shown in FIG. 2, the fingers 2d are bent so that the fingers 2d face each other in a direction orthogonal to a longitudinal direction of the through holes 3c. In addition, the bent sections 2h of the fingers 2d are parallel to the longitudinal direction of the through holes 3c.

Although conventional holder stays are formed with resin material, such as, for example, Bakelite and other such plastics, some holder stays have attachment surface sections 3a that are made of metal. The attachment surface sections 3a are made of metal to increase heat resistance and heat dissipation. However, when the fingers 2d of the brush holders 2 are fixed to the holder stay as described above, the attachment surface section 3a of the holder stay 3 that is made of metal has a decreased frictional resistance and weak fixing power because metal parts are fixed to metal parts.

Attempts have been made to increase the fixing power of such a holder stay 3 by increasing the press load at the time the fingers are being fixed. However, since the attachment surface section 3a of the holder stay 3 is made of metal, the attachment surface section becomes thinner than when the holder stay 3 is made of plastic. In addition, the spring-back characteristic of metal then becomes a problem. As a result, the fixing power is not particularly increased even if the press load is increased. Additionally, there is a limit as to how much of a press load can be applied because there is a possibility of deforming the holder stay 3 under the large press load.

SUMMARY OF THE INVENTION

The claimed invention is intended to overcome the shortcomings in the related art discussed above.

The invention includes fingers extending from a free end of respective leg pieces of a brush holder. Each finger is passed through a respective through hole provided in a surface section of a holder stay. Each finger is obliquely bent along the back face of the attachment surface section of the holder stay such that a finger section of each finger diagonally passes through the respective through hole. Because each finger passes through a respective through hole diagonally, side rims of each finger engage the periphery of each through hole whereupon the obliquely bent fingers are fixed.

Backlash of the fingers is regulated by the side rims of the fingers engaging the periphery of the through holes. As such, the fingers are fixed to the attachment surface section without backlash occurring even if both the brush holder and the attachment surface section of the holder stay are made of metal.

With this structure, by bending the fingers obliquely with respect to a longitudinal axis of the brush holder, the fingers are bent such that they are able to compensate for any occurrence of backlash. Therefore, it is possible to more securely fix the fingers to the back face of the attachment surface section of the holder stay without the backlash occurring.

The present invention performs the fixing through a first bending process in which the fingers are partially bent along the back face of the attachment surface section of the holder stay. A second bending process then completely bends the fingers along the attachment surface section of the holder stay. Furthermore, in the second bending process, the fingers are bent such that they are oblique to the longitudinal axis of the brush holder and as such, portions of each finger engage respective portions of the through holes such that the fixing may be performed without adding excessive stress to the fingers.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A detailed description of the preferred embodiment of the brush holder fixing device of the invention is provided with reference to the drawings. In the drawings, like reference numerals have been used to designate like elements.

Figure 3:
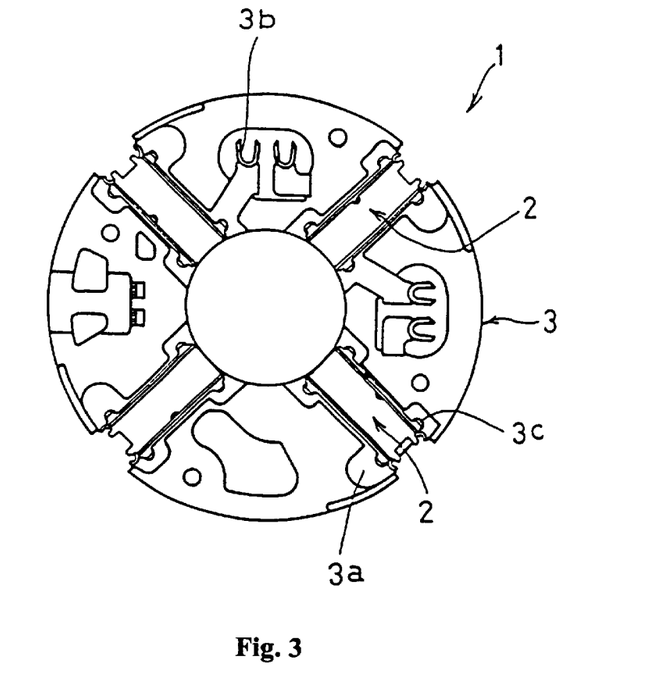
FIG. 3 is a top view of a brush holder assembly.

Looking at FIG. 3, it can be seen that reference numeral 1 represents a brush holder assembly of an electric motor.

The brush holder assembly 1 includes a plurality of brush holders 2 fixedly attached to a disc-like holder stay 3. The brush holders 2 movably hold a plurality of holding brushes (not shown) within the brush holder assembly 1. The holder stay 3 includes an attachment surface section 3a to which the brush holder 2 is attached by penetrating through holes 3c of the holder stay 3.

Figure 4:
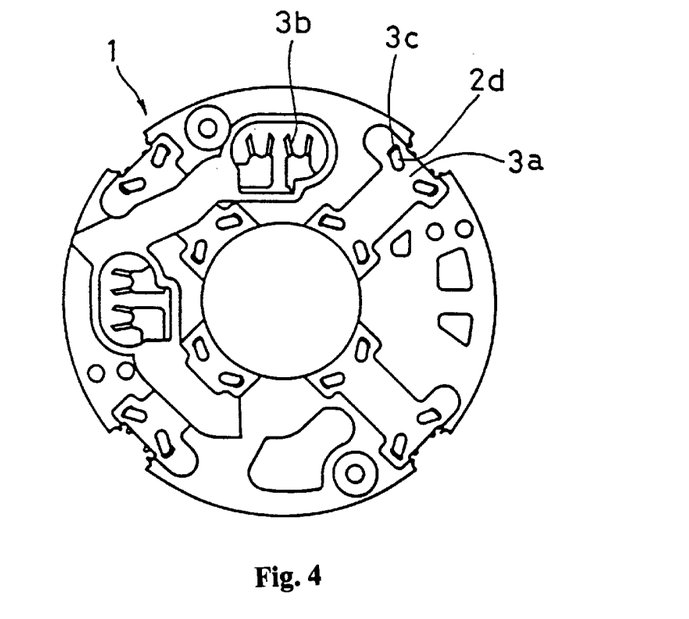
FIG. 4 is a bottom view of the brush holder assembly.

Looking at FIG. 4, a bottom view of the brush holder assembly 1 shows how leg pieces 2d of the brush holder 2 penetrate the through holes 3c and are fastened to a rear side of the attachment surface section 3a of the holder stay 3. In addition, a terminal section 3b of the holder stay 3 can be seen for connection to a power source, such as a battery. The holder stay 3 of this embodiment is formed by molding the attachment surface sections 3a, which are made of metal, such as, for example, brass, and terminal sections 3b with plastic material, for example, polyphenylene sulfide.

Figure 5:
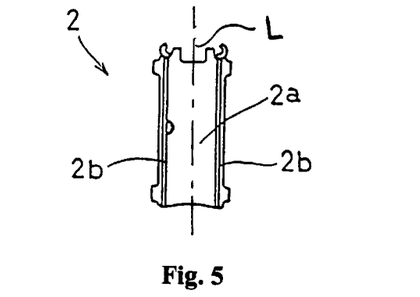
FIG. 5 is a top view of a brush holder.
Figure 6:
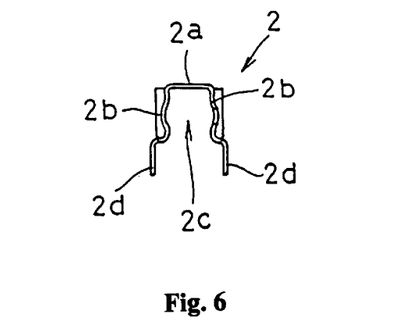
FIG. 6 is a n end view of the brush holder.

Looking at FIG. 5, the brush holder 2 has an upper surface 2a with leg pieces 2b attached thereto. The leg pieces 2b are provided along the longitudinal direction of the brush holder 2. As can be seen in FIG. 6, the brush holder 2 generally has a horseshoe shape formed by the leg pieces 2b extending away from the upper surface 2a. The horseshoe shaped groove 2c extends in a longitudinal direction along a longitudinal axis L of the brush holder 2. The free end of each leg piece 2b has a finger 2d formed thereon. A brush (not shown) is fitted within the horseshoe shaped groove 2c formed by the upper surface 2a, leg pieces 2b and fingers 2d, respectively. When the brush holder 2 is attached to the attachment surface section 3a of the holder stay 3, the brush holder 2 is fixed thereto, with the longitudinal direction of the groove 2c facing in the radial direction of the holder stay 3 and with the open side of the groove 2c facing the surface of the attachment surface section 3a. See FIG. 9. The brush is then fitted in the horse-shoe-shaped groove 2c so that the brush may freely move in the longitudinal direction of the groove 2c.

Figure 7:
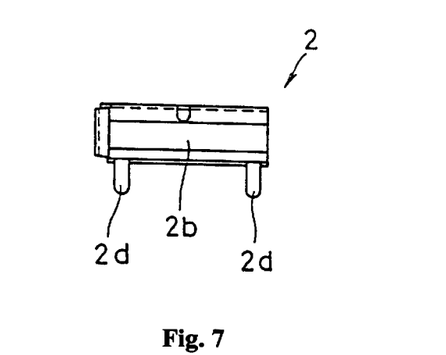
FIG. 7 is a left side view of the brush holder.
Figure 8:
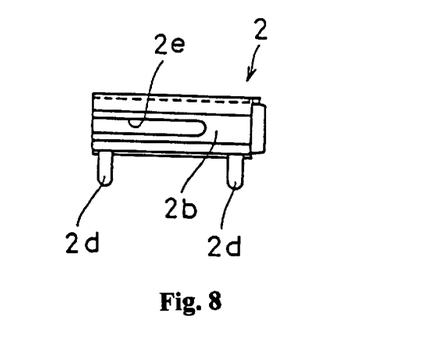
FIG. 8 is a right side view of the brush holder.

Preferably, four fingers 2d for attaching the brush holder 2 to the holder stay 3 project from the free ends of the left and right leg pieces 2b. As is shown in FIGS. 7 and 8, respectively, before the brush holder 2 is attached to the holder stay 3, the fingers 2d provided at the end of the leg pieces 2b are parallel to each other. In addition, turning to FIG. 8, it can be seen that reference numeral 2e represents a groove for drawing out a pigtail (not shown) provided in the brush holder 2.

Figure 9:
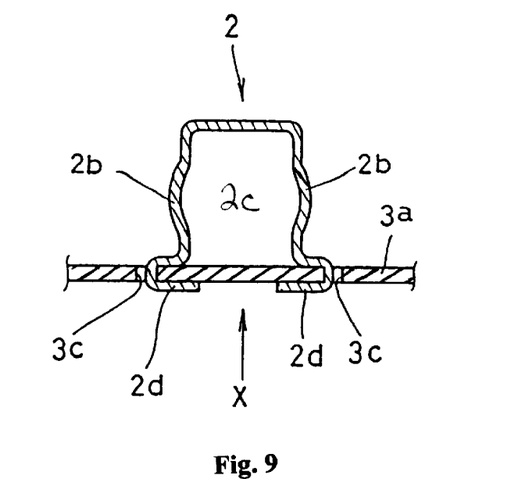
FIG. 9 is a cross-sectional view of a brush holder engaging an attachment surface section.
Figure 10:
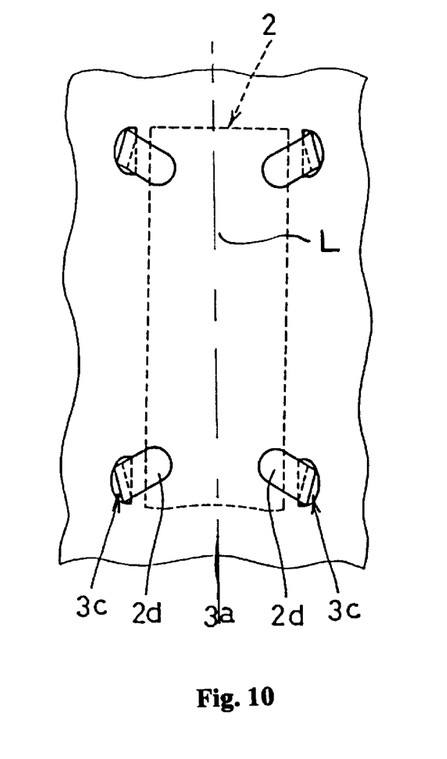
FIG. 10 is a bottom view of the brush holder engaging the attachment surface section shown in FIG. 9 looking in the direction indicated by X.

FIG. 9 is a cross-sectional view of the brush holder 2 engaging the attachment surface section 3a of the holder stay 3. The brush holder 2 is attached and fixed to the holder stay 3 by passing the fingers 2d through the through holes 3c in the front face side of the attachment surface section 3a. The fingers 2d are then bent inward toward the horseshoe shaped groove 2c and along the back face side of the attachment surface section 3a, as shown in FIG. 10.

Figure 11:
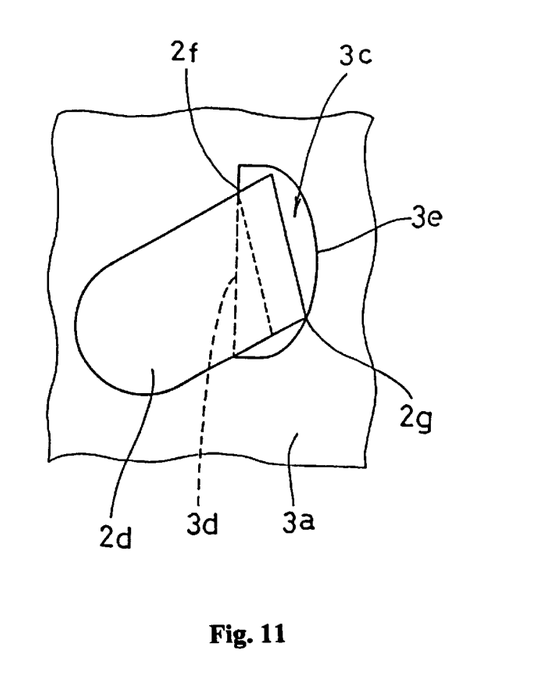
FIG. 11 is an enlarged partial view of a finger of the brush holder engaging side rim portions of a through hole in the attachment surface section shown in FIG. 10.

The through holes 3c, through which each finger 2d loosely passes, respectively, are provided in each attachment surface section 3a. Each finger 2d has a corresponding through hole 3c. The through holes 3c extend parallel to the longitudinal axis L of the brush holder 2 and the horseshoe shaped groove 2c. As shown in FIG. 11, each through hole 3c preferably forms a D-shaped slot having a periphery that includes a straight edge 3d and an arc 3e attached to the edge 3d. The straight edge 3d is parallel to the longitudinal axis L of the brush holder 2 and is formed closer to the portion of the attachment surface section 3a covered by the horse-shoe shaped groove 2c than the arc 3e.

When the fingers 2d penetrating the through holes 3c are bent along the back face of the attachment surface section 3a, a side rim 2f section of each finger 2d engages a portion of the straight edge 3d while another side rim 2g section of each finger 2d engages the arc 3e. Returning to FIG. 10, it can be seen that each finger 2d is bent obliquely along the back face of the attachment surface section 3a relative to the longitudinal axis L of the brush holder 2. As such, end sections of each finger 2d face a diagonally opposed finger 2d while the side rims 2f and 2g of each finger 2d engage the straight edge 3d and arc 3e, respectively, of the corresponding through hole 3c.

Figure 12:
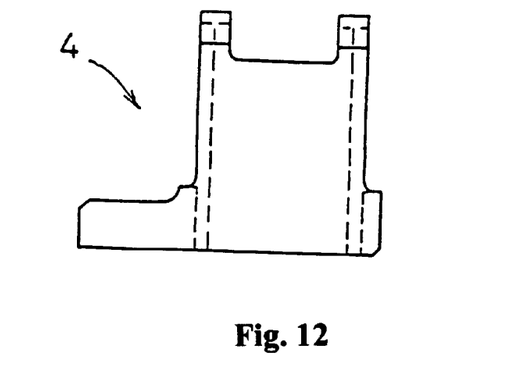
FIG. 12 is a side elevation view of the first jig.
Figure 13:
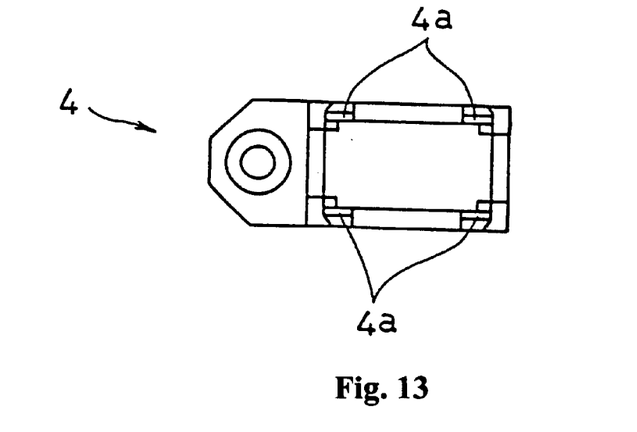
FIG. 13 is a top view of a first jig.
Figure 14:
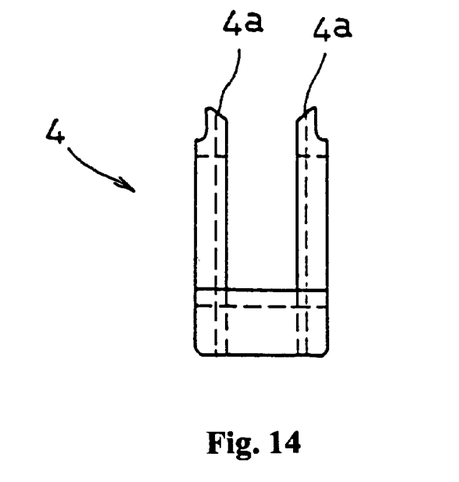
FIG. 14 is a n end view of the first jig.
Figure 15:
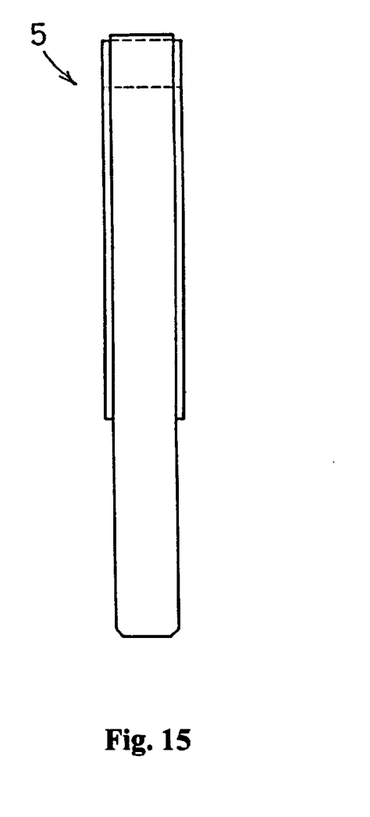
FIG. 15 is an end view of the second jig.

FIG. 12 is a side elevation view of a first jig 4 used for fixing the fingers 2d of the brush holder 2 to the attachment surface section 3a of the holder stay 3. FIG. 13 depicts a top view of the first jig 4 and FIG. 14 depicts an end view. As shown in FIGS. 13 and 14, the first jig 4 has inclined first guide sections 4a, each formed in a respective corner section of the upper end of the first jig 4. Also, each inclined first guide section 4a is designed to contact a respective finger 2d that passes through a respective through hole 3c, such that each finger 2d is partially bent obliquely relative to the longitudinal axis L along the back face of the attachment surface section 3a.

Figure 16:
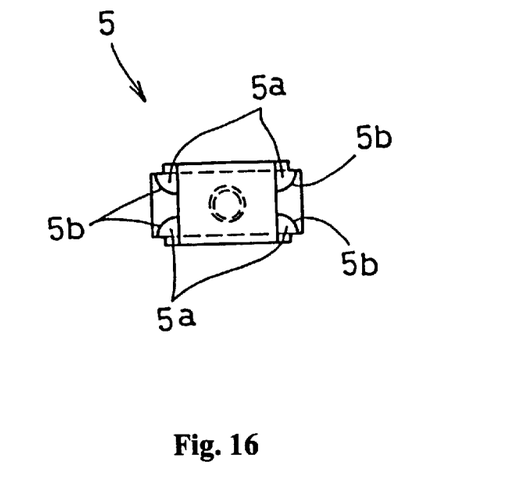
FIG. 16 is a top view of a second jig.
Figure 17:
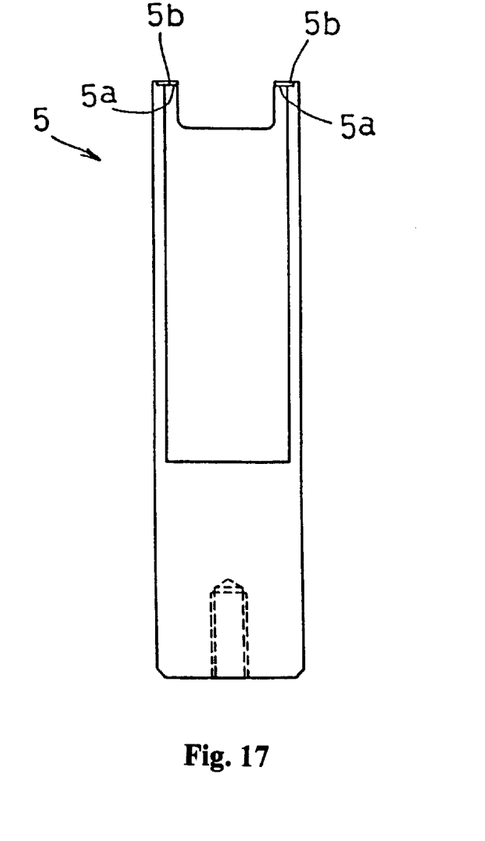
FIG. 17 is a side elevation view of the second jig.

FIG. 17 is a side elevation view of a second jig 5 used for fixing the fingers 2d of the brush holder 2 to the attachment surface section 3a of the holder stay 3. The second jig 5 is fitted into the first jig 4 such that the second jig 5 can move freely relative to the first jig 4 in a vertical direction. Looking at FIG. 16, showing a top view of the second jig 5, and FIG. 17, it can be seen that the second jig 5 has concave sections 5a for further bending the fingers 2d that were partially bent by the first guide sections 4a along the back face of the attachment surface section 3a. The concave sections 5a are formed in the upper end face of the second jig 5 and have a depth set so that when the fingers 2d are completely bent along the back face of the attachment surface section 3a, the fingers 2d may suitably be fixed to the holder stay 3. The second jig 5 also includes second guide sections 5b that obliquely bend the fingers 2d penetrating the through holes 3c such that the side rims 2f and 2g of each finger 2d engage the straight edge 3d and arc 3e, respectively, of each through hole 3c. Each second guide section 5b is formed in an arched shape so that the bending may be gradually performed in the inclined direction of the finger 2d.

First and second jigs 4 and 5 simultaneously fix the four fingers 2d of the brush holder 2 to the attachment surface section 3a of the holder stay 3, as will be explained with reference to FIGS. 18A through F.

Figure 18A:
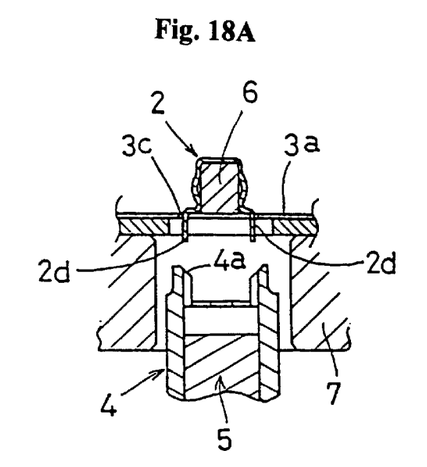
FIGS. 18A to F depict the fixing process of the fingers.

As shown in FIG. 18A, the fingers 2d of the brush holder 2 first penetrate the through holes 3c from the front face of the attachment surface section 3a. A guide shoe 6 is fitted within the horseshoe shaped groove 2c of the brush holder 2 for support. A stay receiver 7 is used to support the back face of the attachment surface section 3a of the holder stay 3. The first and second jigs 4 and 5, with the second jig 5 placed within the first jig 4, are positioned beneath the fingers 2d passing-through the through holes 3c. The first guide sections 4a of the first jig 4 project higher than the upper end sections of the second jig 5.

Figure 18B:
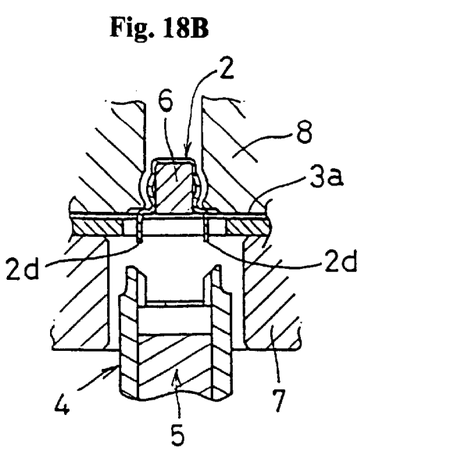
Figure 18C:
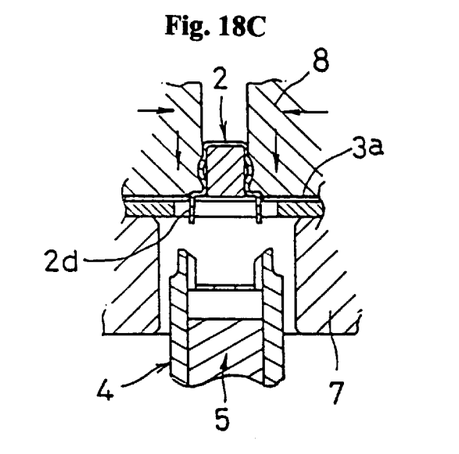
Figure 18D:
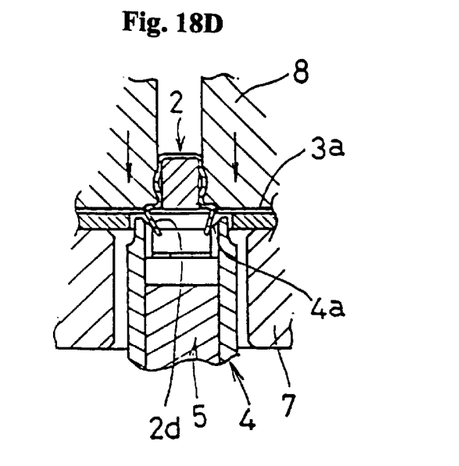

Looking at FIGS. 18B and C, it can be seen that a holder guide 8 supports the outside of the brush holder 2, a base end section of the fingers 2d, and the upper side of the holder stay 3. By moving the holder guide 8 downward while in this position, the inclined first guide sections 4a of the first jig 4 contact the outside face of the fingers 2d and partially bend the fingers 2d toward the back face of the attachment surface section 3a, as shown in FIG. 18D.

Figure 18E:
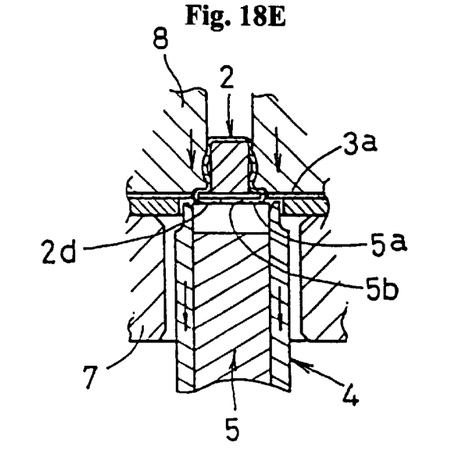
Figure 18F:
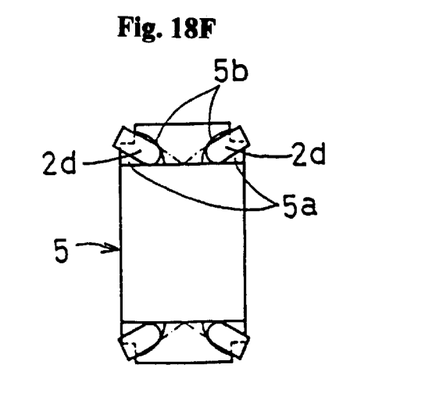

When the holder guide 8 and the first jig 4 are simultaneously lowered from this state, the second jig 5 is raised upward against the fingers 2d. The concave sections 5a of the second jig 5 contact the partially bent fingers 2d and bend them further upward. Consequently, the fingers 2d are completely and obliquely bent along he back face of the attachment surface section 3a, as shown in FIG. 18E. Moreover, looking at FIG. 18F, it can be seen that simultaneously with the bending of the finger 2d by the concave sections 5a, the fingers 2d are also bent by the arched second guide sections 5b which are formed in the insides of the concave sections 5a such that the respective side rims 2f and 2g of the fingers 2d engage the straight edge 3d and arc 3e, respectively, of the through holes 3c.

As such, the brush holder 2 is attached and fixed to the holder stay 3 by passing the fingers 2d, which extend from the left and right leg pieces 2b, through the D-shaped through holes 3c that are provided in the attachment surface section 3a of the holder stay 3. The fingers 2d are then bent along the back face of the attachment surface section 3a by the first and second jigs 4 and 5. Because the fingers 2d are bent oblique to the longitudinal axis L of the brush holder 2, the respective side rims 2f and 2g of the fingers 2d engage the straight edge 3d and arc 3e, respectively, of a corresponding through hole 3c.

Consequently, backlash of the fingers 2d is regulated by the side rims 2f and 2g of each finger 2d engaging the straight edge 3d and arc 3e, respectively, of the through holes 3c. As such, it is possible to fix the fingers 2d of a brush holder 2 to a holder stay 3 without backlash occurring, even if both the brush holders 2 and attachment surface sections 3a of the holder stay 3 are made of metal. Furthermore, since the securing of the fingers 2d to the holder stay 3 without backlash can be performed even if press load at the time the fingers 2d are fixed thereto is light, it is also now possible to avoid deforming of the holder stay 3 with a heavy press load.

Moreover, because the respective side rims 2f and 2g of the fingers 2d engage the straight edge and arc, respectively, of the through holes 3c, thereby locking the fingers 2d to the attachment surface section 3a, backlash is still prevented even if all of the bent surface sections of the fingers 2d do not completely contact the attachment surface section 3a, but float a little bit or are curved and have an arched shape.

In addition, in this embodiment, two pairs of fingers 2d are provided in the brush holder 2. Since both pairs of fingers are bent obliquely relative to the longitudinal axis L of the brush holder 2, portions of the fingers 2d face each other. Thus, the fingers 2d are bent in a direction such that the fingers 2d can compensate for the occurrence of backlash. Therefore, it is possible to more securely fix the fingers 2d to the back face of the attachment surface section 3a of the holder stay 3 without the backlash.

Furthermore, at the time the fingers 2d are being fixed, two bending processes are provided. The first bending process occurs when the fingers 2d are partially bent by the first jig 4. The second bending process occurs when the partially bent fingers 2d are bent obliquely by the second jig 5 along the back face of the attachment surface section 3a. Consequently, it is possible to easily perform the fixing without adding excessive stress to the fingers 2d, even if the fingers 2d are bent obliquely to engage the straight edge 3d and arc 3e of the through holes 3c.

Moreover, the second guide sections 5b provided in the second jig 5 are formed in an arched shape so as to incline the fingers 2d against the through holes 3c. Therefore, the bending of the fingers 2d does not occur abruptly, but gradually. Hence, it is possible to avoid the fingers 2d from breaking by decreasing the torsional stress acting on the fingers 2d.

While the invention has been described in conjunction with a specific embodiment thereof, it is evident that many alternatives, modifications and variations may be apparent to those skilled in the art. Accordingly, the preferred embodiment of the invention as set forth herein is intended to be illustrative, not limiting. Various changes may be made without departing from the spirit and scope of the invention as defined in the following claims.

What is claimed is:

1. A fixing device for a brush holder, comprising:

a holder stay having an attachment surface section with at least one pair of through holes, each of said through holes containing an arcuate portion and a straight portion; and a brush holder having a longitudinal axis and first and second leg pieces parallel to the longitudinal axis and extending away from an upper surface of the brush holder, said straight portion of said through holes is substantially parallel to the longitudinal axis, each said leg piece having a finger extending from a free end of said leg piece, each said finger penetrating a corresponding through hole and extending to a back face of said attachment surface section of said holder stay, a first side rim of each said finger engages said arcuate portion of each corresponding said through hole, whereupon said finger of said first leg piece is opposed to a corresponding said finger of said second leg piece to form a pair of opposed fingers and said pair of opposed fingers are bent obliquely relative to the longitudinal axis of said brush holder toward a common end of the longitudinal axis.

2. The device according to claim 1, wherein each of said first leg piece and said second leg piece has at least two fingers and each said finger of said first leg piece is opposed to a corresponding said finger of said second leg piece to form a first pair of opposed fingers and a second pair of opposed fingers, said first pair of opposed fingers being bent toward a first common end of the longitudinal axis and said second pair of opposed fingers being bent toward a second common end of the longitudinal axis.

* * * * *